United States Patent [19]
Ichige et al.

[11] Patent Number: 5,710,590
[45] Date of Patent: Jan. 20, 1998

[54] IMAGE SIGNAL ENCODING AND COMMUNICATING APPARATUS USING MEANS FOR EXTRACTING PARTICULAR PORTIONS OF AN OBJECT IMAGE

[75] Inventors: Kenji Ichige, Chigasaki; Takuya Imaide, Fujisawa; Ryuji Nishimura; Norio Yatsuda, both of Yokohama; Hiroyuki Kuriyama, Tokyo; Mayuko Oda, Kawasaki, all of Japan

[73] Assignee: Hitachi, Ltd., Tokyo, Japan

[21] Appl. No.: 418,688

[22] Filed: Apr. 7, 1995

[30] Foreign Application Priority Data

Apr. 15, 1994 [JP] Japan ................................. 6-076863
Jul. 7, 1994 [JP] Japan ................................. 6-155691

[51] Int. Cl.⁶ ............................. H04M 11/00; H04N 7/14
[52] U.S. Cl. ......................... 348/14; 348/17; 348/51; 379/96
[58] Field of Search ........................ 379/53, 54, 90, 379/93, 96, 97, 98; 348/13, 14, 17, 51

[56] References Cited

U.S. PATENT DOCUMENTS

| | | | |
|---|---|---|---|
| 5,073,927 | 12/1991 | Grube | 348/14 |
| 5,426,460 | 6/1995 | Erving et al. | 348/14 |

FOREIGN PATENT DOCUMENTS

0566188  10/1993  European Pat. Off. ............. 348/17

OTHER PUBLICATIONS

A. N. Netravali, B.G. Haskell: "Digital picture" pp. 115–119, AT&T Bell Lab. (1988).
JP-A-57-129076.
"Journal of Institute of Television Engineers of Japan", vol. 45, No. 7 (1991), pp. 793–799.
JP-A-62-120179.
"Systematic Image Encoding", Makoto Miyahara pp. 1–14, IBC.
JP-A-59-208983.
JP-A-4-205070.
ITU-T Recommendation H261, Video codes for audiovisial Series at px 64kbits (1993).
W. F. Schreiber;"Fundamentals of electronic imaging systm", Springer–Verlag (1993) p. 106.
"Encoding technology for television telephone and television conference" p. 793, Journal of Institute of Television Engineers of Japan, vol. 47 (1991), No. 7.
JP-A-5-27346.
JP-A-3-22753.
JP-A-6-225328.
"Intelligent image processing" chapter 8 pp. 132–139, Shokodo (1994), Agiri and Nagahashi.
JP-A-5-22753.

*Primary Examiner*—Curtis Kuntz
*Assistant Examiner*—Stephen W. Palan
*Attorney, Agent, or Firm*—Antonelli, Terry, Stout & Kraus, LLP.

[57] ABSTRACT

A picture communication apparatus includes an extracting circuit for extracting video data of at least one portion from video data inputted thereto, an encoder for respectively encoding the extracted video data and the remaining video data, and a multiplexer for multiplexing the encoded video data. When encoding the video data, predetermined amount of codes are allocated to the respective video data. This suppresses deterioration in the picture quality when conducting an image communication via a transmission path having a low transmission rate. The transmitted video is displayed on a contoured display.

3 Claims, 10 Drawing Sheets

( CODE $B_1$ + CODE $B_2$ + ------ + CODE $B_m$ = CODE B )

FIG.11A
MODEL OF MOUTH

FIG.11B
BASIC FORM

FIG.11C
INFORMATION OF VARIATION

BASIC INFORMATION
DISPLACEMENT INFORMAITON
FRAME
m FRAME

| PART NO. / TYPE NO. | HAIR 0 | FACE 1 | RIGHT EYE 2 | LEFT EYE 3 | RIGHT EYEBROW 4 | LEFT EYEBROW 5 | MOUTH 6 | --- |
|---|---|---|---|---|---|---|---|---|
| 0 | ⌒00 | ○10 | ◕20 | ◕30 | ⌒ | ⌒ | ▬ | |
| 1 | ⌒01 | ○ | • | • | ⌒ | ⌒ | ○ | |
| 2 | ⌒02 | ○ | ◠ | ◠ | ◣ | ◢ | ○ | --- |
| ⋮ | ELEMENT NO. | | ⋮ | | | | | |

FIG.17

ELEMENT NO. , COLOR(r-y,b-y), POSITION(x,y), SIZE)

—— MODEL IMAGE
—— TRANSMITTED IMAGE

IMAGE SIGNAL ENCODING AND COMMUNICATING APPARATUS USING MEANS FOR EXTRACTING PARTICULAR PORTIONS OF AN OBJECT IMAGE

BACKGROUND OF THE INVENTION

The present invention relates to an image encoding and picture communication apparatus, for example a video phone and an image recording apparatus.

Conventionally, as communication apparatuses to communicate voices and tones, there has been used a video telephone facility (A. N. Netravali, B. G. Haskell, "Digital Picture", pp. 115–119, AT&T Bell Lab. (1988)). The apparatus includes a sending facility including an imaging apparatus, a voice input device, and an encoder circuit for encoding images and voices; a receiving facility including a decoder for decoding signals of images and voices, a display including a speaker and CRT; and a communication controller for communicating images and voices via a network. In such conventional apparatuses, the contents of an image produced by a camera are entirely encoded and transmitted via a transmission line, which leads to necessity of transmitting a large amount of data. Consequently, a low-priced videophone of a type conducting communication via a low-speed analog communication line has been attended with a problem in which the picture quality is considerably deteriorated or motion of pictures becomes uncomfortable and unnatural.

Various attempts have been made to cope with the problem above. For example, according to a videophone apparatus described in the JP-A-57-129076, a background image beforehand prepared is compared with a video currently being produced so as to accordingly clear the background, thereby achieving security control and minimizing the amount of image information to be transmitted.

However, when users of the system conduct communication while viewing images of each other, the images of the persons are most important in ordinary cases. Namely, background images of the respective persons are less important in many cases. In consideration of effective allocation of the limited amount of codes, it can be consequently regarded as inefficient to uniformly encode the constituent elements of an image in an obtained frame, namely, to uniformly assign the same quantity of codes to objects having different values of significance to the communicating users.

Furthermore, the videophone apparatus described in the JP-A-57-129076 requires a procedure of shooting the background image in advance. Namely, consideration has not been given to operability and usability of the users.

SUMMARY OF THE INVENTION

It is therefore an object of the present invention to provide a picture communication apparatus which can be used even though a low-speed transmission path such as analog phone-line while retaining a satisfactory quality of picture.

To achieve the object according to the present invention, there are arranged image extraction means for extracting images of particular portions of an object, coding means for coding the extracted image portions and means for communicating a partner with image data.

The image extraction means extracts images of particular portions of a subject. Each of the extracted images is encoded in an encoding method or encoded by changing encoding parameters to produce a quantity of codes according to significance of the pertinent image portion. This optimally distributes codes to the respective portions of a screen image.

Moreover, in a videophone apparatus and a video conference system, a video signal produced by an imaging apparatus is encoded to be transmitted via a transmission path such as an integrated services digital network (ISDN). For example, for component national television system committee (NTSC) signals, when the signals are not compressed in transmission data, the transfer speed in terms of bits is 216 megabits per second (Mbps) according to the studio standards of color television. This leads to a requirement that the signals are to be more efficiently encoded to reduce the number of bits of transmission data. As the encoding method, there has been primarily employed a method described in pages 793 to 799 of the "Journal of Institute of Television Engineers of Japan", Vol. 45, No. 7 (1991). Namely, there is basically used a conditional pixel supplementing method on the basis of inter-frame estimation or forecasting in which only mobile portions are transmitted such that other encoding methods such as a discrete cosine transform (DCT) are additionally used in combination with the conditional pixel supplementing method. Thanks to development of such a highly efficient encoding technology, videophones and video conference systems using ISDN lines have been widely introduced to practical uses in business and industrial fields. A communication method in which an image is transformed into codes for transmission thereof has been described, for example, in the JP-A-62-120179 and in "Systematic Image Encoding" written by Makoto Miyahara in pages 1 to 14 of the IPC.

Although there have been known low-cost communication systems such as a videophone using analog transmission, to carry out transmission at a low transmission rate, the picture quality has been sacrificed to a considerable extent. This consequently leads to the following problems. Expression appearing particularly in a human face cannot be satisfactorily transmitted or displayed and variations in the expression cannot be communicated in a realtime fashion, resulting in an unnatural motion of the face.

Another object of the present invention is to provide a videophone system capable of producing a high-quality video image in a realtime manner even through such a transmission line having a low transmission rate as an analog telephone line, thereby solving the above problem.

To achieve the above object according to the present invention, there is provided a system including a database storing therein knowledge of models related to a subject, a video camera including extraction processing means for extracting the subject shot by the camera and computing features thereof and encoding means for analyzing the features from the extraction processing means and converting the features into description of knowledge corresponding to the database, interface means for converting the description of knowledge generated by the encoding means into signals conforming to a signal system of a signal transmission path and transmitting the knowledge description to a receiver and converting a signals sent from a sender into description of knowledge, and decoding means for composing a video signal according to the knowledge description from the sender side by reference to the database.

The constituent means above operate to achieve the object as follows.

When the sender transmits an image, the video camera including, in addition to the extraction processing means and encoding means, a signal processing circuit and a control circuit commonly used for digital video cameras conducts signal processing known in the processing of video signals produced by an imaging apparatus to resultantly generate such signals of the image as video signals. The extraction processing means extracts the subject from the video signal generated by the signal processing circuit to compute such features of elements of the extracted object as the size, contour, color, coordinates of center of mass, and gradient. The encoding means including a micro computer or the like analyzes information of the features from the extraction processing means, recognizes elements constituting the object and states thereof, and transforms the recognized information items into knowledge description corresponding to the database including knowledge of models related to the subject. The interface means transforms the knowledge description generated by the encoding means into signals conforming to a signal system of the transmission path and transmits the resultant signal through the transmission path.

The signal received via the transmission path is converted by the interface means into knowledge description. The decoding means decodes the knowledge description to reconstruct the transmitted image. In this operation, the decoding means accesses the database keeping therein a large number of images of models related to the object and then selects therefrom video data items associated with the elements constituting the image sent from the sender so as to restore the original image.

That is, the sender does not transmit the image itself. The image of an object such as a human face to be transmitted is beforehand transformed into knowledge description representing the image such that the knowledge description is sent as transmission data. In the receiver, the knowledge description is decoded into the image of the subject as above.

With this provision, the amount of transmission data is remarkably minimized and hence it is possible to construct a videophone system capable of communicating high-quality pictures in a realtime manner even through such a communication line having a low transmission rate as an analog telephone line.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Next, description will be given of an embodiment of an picture communication apparatus according to the present invention.

Figure 2:
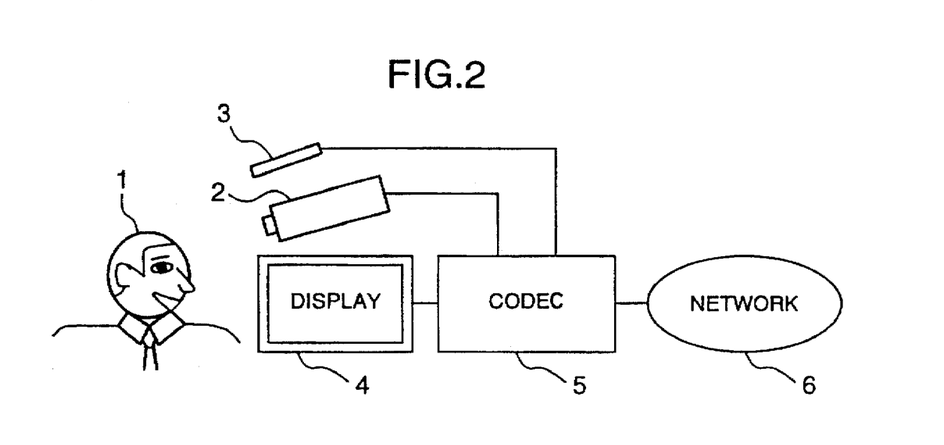
FIG. 2 is a diagram showing the overall configuration of an image communicating apparatus according to the present invention.

FIG. 2 shows structure of a picture communication apparatus such as a videophone facility including a user 1 conducting communication via the apparatus, a video input apparatus 2, voice input device (microphone) 3, a display device 4, codec 5, and a communication network 6.

The user 1 of the communicating apparatus communicates via a communication network with a partner using a similar communicating apparatus at a remote place. The imaging device 2 shoots an image of the user 1 and then inputs a video signal of the image to the encoder 5. The microphone 3 transforms the voice of the user 1 into a voice signal to be fed to the encoder 5. The encoder 5 encodes the video and voice signals into a signal of code (communication signal) conforming to the network 6 and then supplies the signal to the network 6. In addition to transmission of the communication signal from the user 1 to the network 6, the decoder 6 conducts reception of a communication signal sent from the communicating partner 1 via the network 6 and then decodes the signal to restore the video and voice signals of the partner 1. The resultant video and voice signals of the communicating partner 1 are fed to the display 4 to be presented as an image and a sound.

Figure 1:
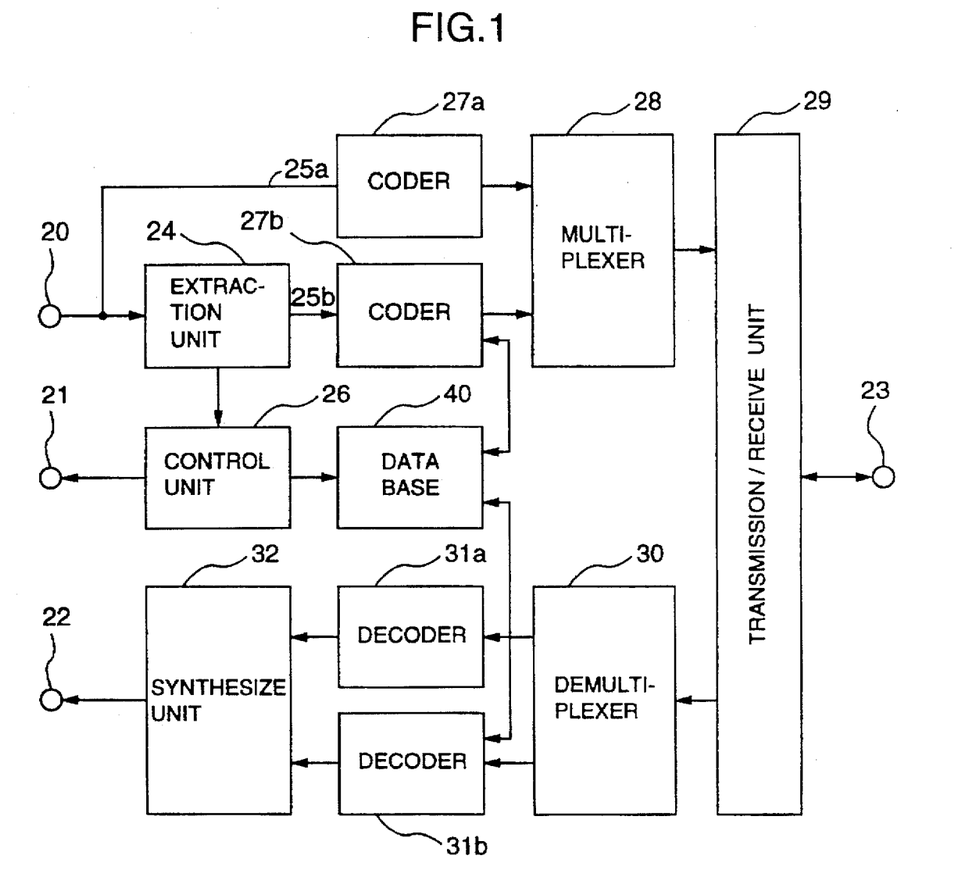
FIG. 1 is a diagram showing a first embodiment of an image communicating apparatus according to the present invention.

FIG. 1 shows an example of structure of the encoding device 5 of FIG. 2. A including an input terminal 20, output terminals 21, 22, an input and output terminal 23, an input signal before an extracting process 25a, an input signal after the extracting process 25b, encoding circuits 27a, 27b, a multiplexer 28, a transmission 1 receive unit 29, demuleiplexer 30, decorder 31a, 31b, and a signal synthesize unit 32. According to the present invention, voices are processed in the ordinary known method and hence description thereof will be avoided. The video signal of the user 1 produced from the imaging apparatus and microphone is received via the input terminal 20. The signal is encoded by encoding means on the sender side including the extracting circuit 24, encoder circuits 27a and 27b, and multiplexer 28. The encoded signal is transformed by the sending and receiving section 29 into a communication signal to be outputted via the input and output terminal 15 to the network. The sending and receiving section 14 conducts the transmission and reception at the same time and receives via the input and output terminal 23 a communication signal containing an image and a voice from the communicating partner. The signal is decoded by decoding means including the separating circuit 30, decoding circuits 31a and 31b, and composing circuit 32 to restore the image signal of the partner. The image signal is then delivered from the output terminal 22. The video signal is sent to the display 4 to be represented as the image of the partner. Although not shown, when the image of the user 1 is to be displayed on the display 4 for confirmation, it is only necessary that a change-over operation is conducted in the sending and receiving section 29 to treat the transmission signal as a reception signal. Alternatively, the input video signal need only be supplied to the composing circuit 32 to be mixed with a received image so as to compose an image to be presented on the display 4.

On receiving the signal from the extracting circuit 24, the control circuit 26 sends a control signal to the imaging apparatus to obtain an optimal input image. The input image signal is first fed to the extracting circuit 24 to extract partial images of the object. In this embodiment, the shooting object is the user of the apparatus. The partial images include the eyes, mouth, etc. of the user. Since the images of the eyes and mouth vary in contour thereof more frequently than those of the other elements of the object, it is necessary to allocate a larger quantity of information items thereto. The extracted partial images (extraction signal 25b) and other partial images (non-extraction signal 25a) are inputted respectively to the encoders 27a and 27b for the encoding thereof. Although the encoding method is not limited, to restore a picture of a higher quality for the extracted partial images, a greater number of codes are generated from the encoder circuit 27b. For the encoder circuit 27a, there may be utilized any encoding methods ordinarily used for videophones (reference is made to ITU-T Recommendation H. 261, Video codes for audiovisual services at p×64 kbits (1993) and to "encoding technology for videophone and television conference" written in page 793 of the Journal of Institute of Television Engineers of Japan, Vol. 47 (1991), No. 7). The encoder 27b may be operated according to the encoding method such as an entropy encoding method (reference is made to page 106 of "Fundamentals of Electronic Imaging System" written by W. F. Schreiber and published from Springer-Verlag in 1993).

The multiplexer 28 multiplexes signals of codes produced from the encoders 27a and 27b in the preceding stage and sends the multiplexed signal to the sender and receiver section 29. The extracting circuit 24 conducts, in addition to extraction of partial images, an operation to compute for each extracted portion the size, contour, and position of a reference point or coordinates of center of mass of the extracted portion and then outputs the resultant data items to the controller 26.

To sense an object and to obtain features thereof, there may be adopted, for example, a method described in the JP-A-59-208983 in which features of an object is attained from differences between images sampled at a fixed interval of time. Alternatively, there may be utilized a method described in the JP-A-4-205070 in which portions of a video signal satisfying a preset condition, for example, a condition determined according to a luminance signal and a color difference signal is regarded as candidates of the object. The current candidate region thus extracted is compared with a region of the object obtained before a predetermined period of time and stored in storage means to determine an area in which these regions are overlapped with each other, thereby finally extracting as the region of the object an area surrounding the overlapped area.

According to the data items from the extraction circuit 24, the control circuit 26 delivers a control signal from the output terminal 27 to regulate the direction or orientation and ratio of magnification of the imaging apparatus 2. As a result, the imaging apparatus 2 is desirably and automatically oriented to the user 1 to shoot an image having an appropriate size. The processing procedure is executed as necessary so that the imaging apparatus 2 automatically follows movement of the communicating person in front thereof. To adjust the orientation and magnification ratio of the imaging apparatus 2, the apparatus 2 may be mechanically or electronically operated. In an imaging apparatus including imaging devices such as charge-coupled devices, the electronic adjustment of orientation above can be achieved by using CCDs including marginal pixels which are other than those used for the output of the imaging apparatus. In addition, the magnification ratio can be electronically conducted by an operation generally called electronic zooming. In the encoding circuit 27b, for the decoding operation to be achieved later, the size and position of the extracted image are encoded together with the extracted image.

In operation on the receiver side, the received signals are separated by the separating circuit 30 into codes of extracted portions and those of the other portions. The separated codes are respectively decoded by the decoders 31a and 31b corresponding to the encoders 27a and 27b, respectively. There are resultantly attained images of the extracted portions and images of the non-extracted portions. These images are fed to the composing circuit 32 to produce an image according to information items of the sizes and positions of the extracted images.

Figure 3:
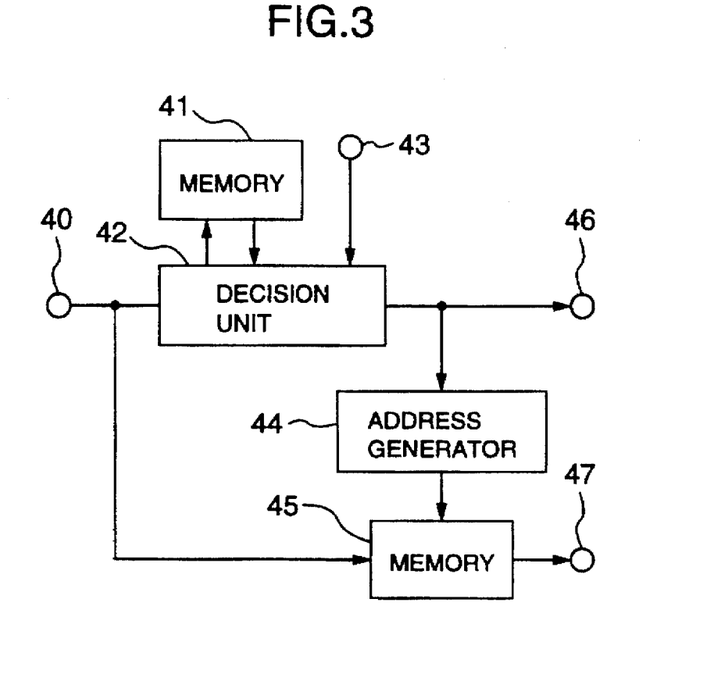
FIG. 3 is a diagram showing constitution of an image extracting circuit of the first embodiment.
Figure 4:
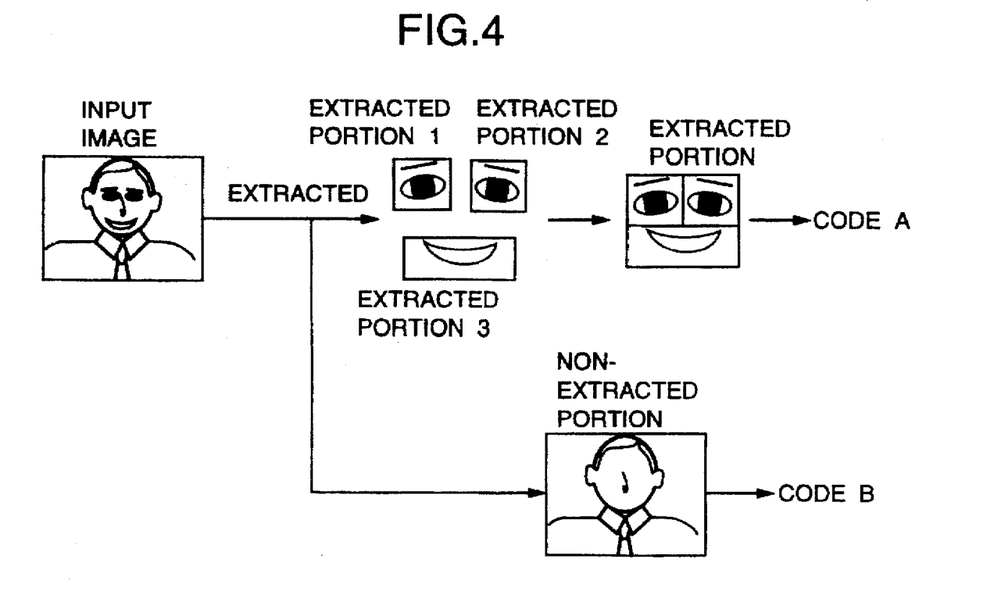
FIG. 4 is a diagram for explaining an encoding method of the first embodiment.
Figure 5:
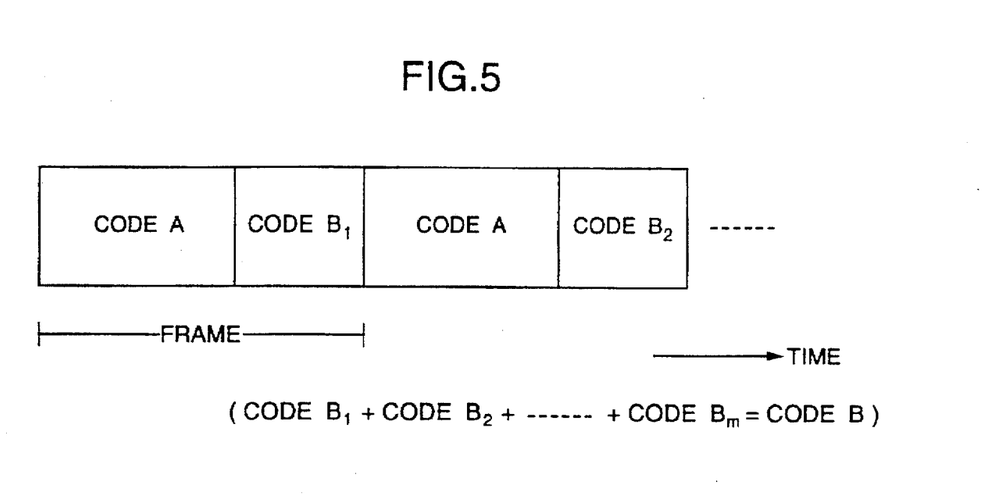
FIG. 5 is a diagram for explaining the encoding method of the first embodiment.

FIG. 3 shows an example of constitution of the extracting circuit 24 of FIG. 1. The extracting method is basically identical to that described in the JP-A-4-205070. In the configuration, reference numerals 40 and 43 designate input terminals, a numeral 41 denotes memory means including one-bit data for each input pixel and keeping therein results of decision for extraction areas, a numeral 45 indicates memory means, a numeral 42 stands for a decision circuit, a numeral 44 represents an address generating circuit, and numerals 46 and 47 designates output terminals. A video signal is fed via the input terminal 40 to the decision circuit 42. The input terminal 43 is employed to input therefrom an extracting condition for each extraction portion. In this situation, it is allowed to specify levels of the luminance and chroma signals as the extraction condition. A plurality of condition items are set for each extraction portion. For example, for the portion of the mouth, a plurality of combinations of luminance and chroma signal levels are set as a red portion of the lip and a white portion of teeth. Since the lip color alters between persons, the luminance and chroma signal levels have allowance ranges, respectively. The decision circuit 42 decides image areas conforming to the extracting conditions in an image received from the input terminal 40. The memory means 41 stores therein the results of processing of the decision circuit 4, namely, extraction image areas for each frame. Furthermore, the memory means 41 stores the extraction image areas for each extraction portion. The results of decision are inputted again to the decision circuit 42 to be utilized as a candidate of an extraction region for the next frame. That is, the decision circuit 42 produces an image region by slightly expanding the previous extraction area for each extraction portion kept in the memory means 41 to make decision for each extraction portion in the produced region. The decision circuit 42 computes the size and position of the image for each extraction portion to deliver the results from the output terminal 46. The data items of the size and position are employed to control the imaging apparatus. According to the control operation, the image of the user's face can be created in a fixed contour. The positional data item of each extraction portion is delivered to the address generating circuit 44 to generate an address in the memory means 41, thereby storing the extraction portions in separate locations, respectively. FIG. 4 shows an example of the results of address generation in which video data of extraction portions are combined with each other to configure one frame such as a CIF (Common Interchange Format) for transmission. Image data stored in the memory means 45 is later read therefrom to be delivered from the output terminal 47.

Figure 7:
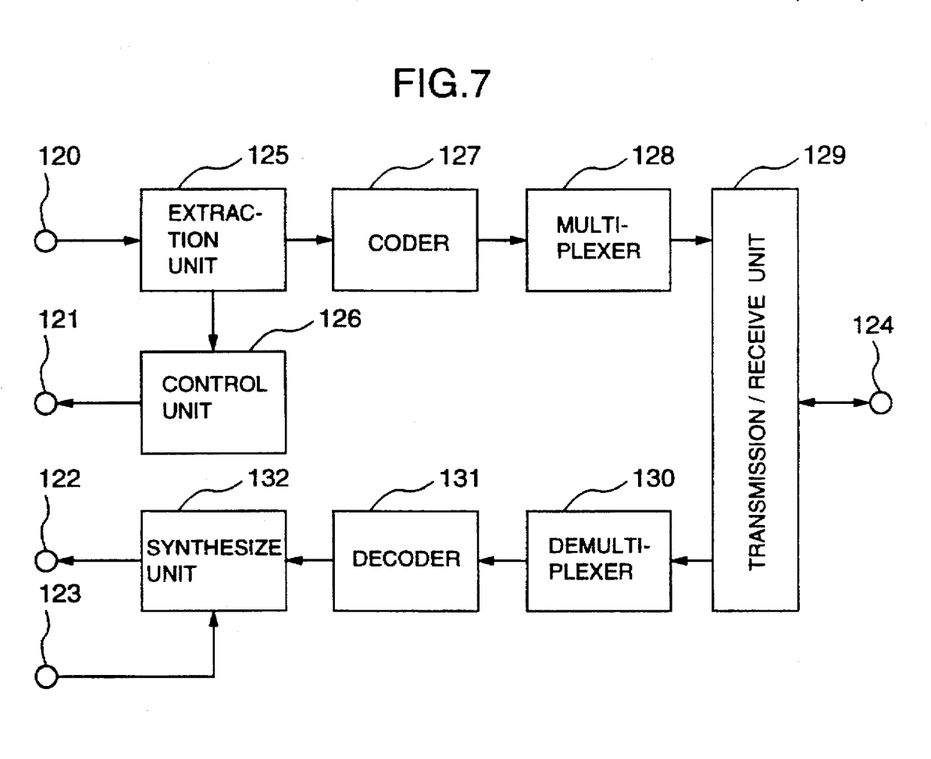
FIG. 7 is a diagram showing structure of encoding means of the second embodiment.

FIG. 7 shows a method of multiplexing two kinds of video data items including those of the extracted portion (code A) and non-extracted portion (code B). The multiplexing of signals are conducted as follows. As the code A of the extracted portion, there is transmitted the latest data for each frame; whereas, for the non-extracted portion, one image is transmitted in an interval of a predetermined number of frames. Moreover, since the extracted portion includes a partial image, when the image is decoded later by the decoder, there is required information of the reproducing position. Consequently, the code A includes also positional information of each extracted image.

According to the embodiment, a greater quantity of codes can be allocated to such images having a larger amount of information as images related to the mouth and eyes. Resultantly, the quantity of overall transmission data necessary for achieving a satisfactory quality of image can be reduced or an image of a higher quality can be obtained without increasing the amount of transmission data.

Figure 6:
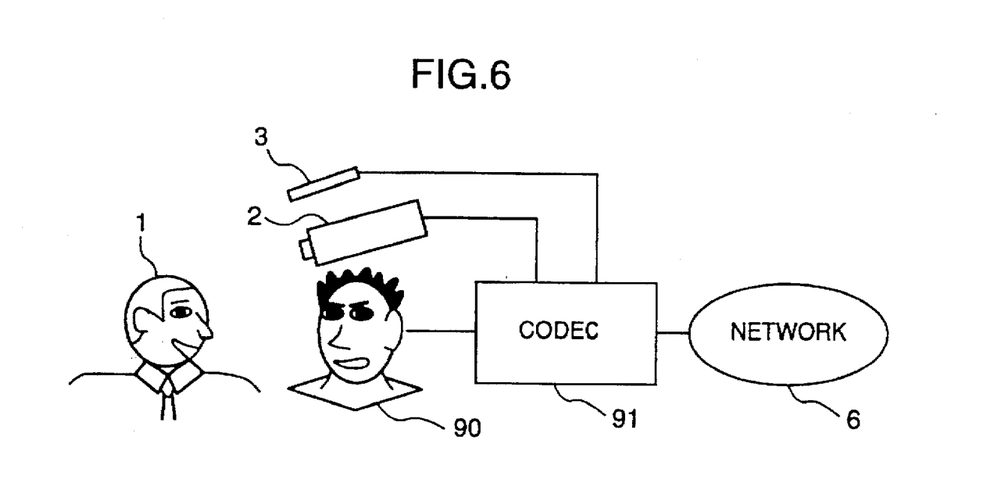
FIG. 6 is a diagram showing a second embodiment according to the present invention.

FIG. 6 shows an alternative embodiment according to the present invention. When compared with the preceding embodiment, this embodiment includes a solid image display of the human head in place of the display of the preceding embodiment. A reference numeral 90 stands for the solid image display and a numeral 91 indicates an encoding apparatus.

FIG. 7 shows constitution of an encoder circuit 12 including an input terminal 120, output terminals 121, 122, an input terminal 123, an input and output terminal 124, an extraction processing circuit 125, a control circuit 126, an encoding circuit 127, a multiplexer circuit 128, a sender and receiver section 129, a separating circuit 130, a decoder circuit 131, and a composing circuit 132. Functions of the respective circuit blocks are the same as the corresponding constituent components of the preceding embodiment. The extracting circuit 125 extracts the elements of the face and the entire face to present the human face on the display 90. Assume that the constituent elements to be extracted are the overall face, eyes, mouth, nose, eyebrows, etc. The elements are assigned with priority levels for the encoding operation thereof. For example, variation in the image of the entire face is less than that in the image of the mouth and hence the entire face is assigned with a lower priority level. The eyes and mouth are equally important in this regard and accordingly assigned with the same priority level so as to allocate a larger quantity of codes thereto.

When it is impossible to vary the shape of solid image display according to the face, the display 90 is subjected to a model of a face having average features to fix the positions of the respective constituent components of the face. An example of the solid image display has been described, for example, in JP-A-5-27346 and JP-A-3-22753. In a flat-plane or two-dimensional display, it is only necessary that the sizes of the respective components approximately reflect those of the actual components of the object in the imaging operation thereof. However, in a three-dimensional display, the positions of the components are required to correctly reflect those of the actual components of the solid display. For this purpose, the positions of the eyes and mouth are first adjusted to fit the display to resultantly decide the sizes of the constituent elements in an automatic fashion. In this connection, the extracting circuit 125 computes positional relationships between the elements to attain the positions of the eyes and mouth during the extracting operation. In the position adjustment, the control circuit 105 is operated according to the positions obtained by the extracting circuit 125 to adjust the imaging position and magnification ratio on the imaging apparatus side. The adjustment process is appropriately carried out by altering between the vertical and horizontal zooming factors by the so-called electronic zooming function. The image of the face is regulated on the sender side to match the solid image display 90; thereafter, the constituent components are extracted.

Figure 8:
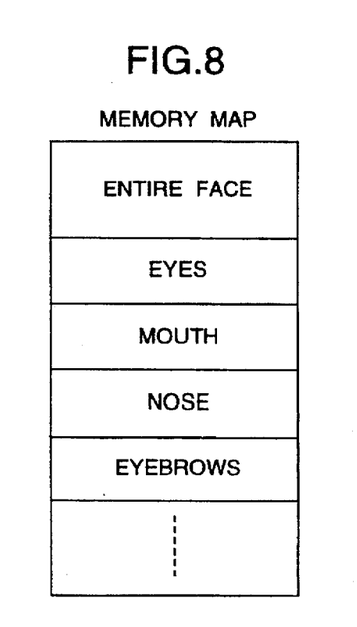
FIG. 8 is a diagram showing a memory map of video data in a storage.

The extracting circuit 125 is configured in the same way as for that of the preceding embodiment shown in FIG. 3. However, in case where the extracted face includes a plurality of constituent elements or variable number of constituent elements, it is difficult to combine the extracted elements to match the format of the transmission frame as described above (FIG. 4). Consequently, there will be introduced another layout of the memory means 45 as shown in FIG. 8. This includes the respective constituent elements simply in memory blocks of the predetermined sizes. The data items outputted from the extracting circuit 125 can be attained by issuing a read command to the memory means 45. Namely, the obtained data items constituting an image of each extracted portion.

The encoder 127 encodes the output from the extracting circuit 125. The encoding method or various parameters used in the encoding of data are determined, as described in conjunction with the preceding embodiment, according to the kind and the priority levels for each extracted image. Each of the encoded images is multiplexed by the multiplexer 128 according to the priority level thereof.

Figure 9:
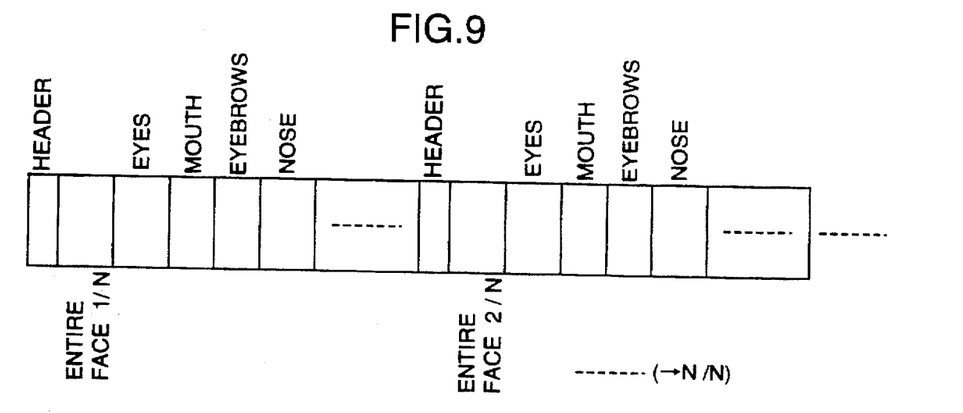
FIG. 9 is a diagram for explaining an encoding method of the second embodiment.

FIG. 9 shows an example of the multiplexing process. Each frame includes a header code field containing, for example, information indicating an internal format of the pertinent frame and a frame identifier (ID) to identify the frame and a video data field of each extracted portion. Video data items of the respective constituent elements are distributed according to the priority levels so that the related portions of a predetermined number of frames constitute information of one frame. According to the distribution method of FIG. 9, only the portions of the face having a lower priority level are distributed into a predetermined number of frames for transmission thereof. The method of distributing codes into a plurality of frames requires a data buffering operation in the multiplexer 128.

The multiplexed codes are transmitted via the sender and receiver section 129 to the network. on the receiver side, the codes are processed primarily by the demultiplexer circuit 130, decoder circuit 131, and synthesize unit 132. The demultiplexer circuit 121 separates codes for each priority level from the multiplexed codes from the sender side. The separated codes are respectively decoded by the decoder 131 to reconstruct images of the respective constituent elements.

Since the frame frequency varies between video data items received for the respective priority levels, the decoder 131 includes memory means for updating video data in the memory for each constituent element. The internal memory means may be configured in the memory format of the extracting circuit shown in FIG. 8. Signals read from the memory means are used as output signals from the decoder circuit 131.

Figure 10:
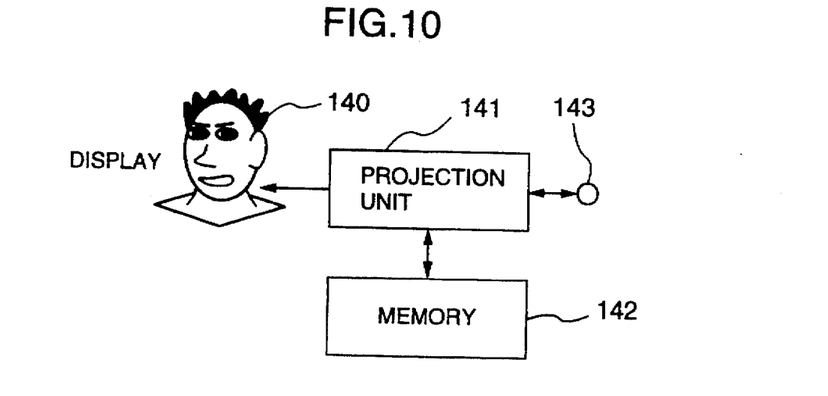
FIG. 10 is a diagram showing constitution of a display of the second embodiment.

On receiving the video output from the decoder 131, the synthesize unit 132 composes an image of each constituent element. Since the positions of the respective elements conform to information from the display 90, it is unnecessary for the sender side to transmit positional information together with the video data. However, if the format for the display 90 is unique, the display 90 need not transmit even the information above.

FIG. 10 shows structure of the solid image display 90 including a display unit thereof 140, a projecting unit 141 for projecting a picture onto the display unit 140, memory means 142, and an input and output (I/O) terminal 143. The memory means 142 stores therein data related to formats of the display unit 140. The data includes data representing three-dimensional positions and sizes of the constituent elements of the face. Since these data items are not changed if the shape of the display is not variable, there is only required a read-only memory fixed for the display. Information of formats is sent via the I/O terminal 143 to the encoding apparatus such that the encoder supplies the display with an image conforming to the display. As above, if information is communicated between the display and the encoding apparatus, it is possible to employ a display of another type.

When an image communication system includes the solid image display as above, there is obtained, in addition to the effect of the preceding embodiment, an advantageous feature that the communication partner is reproduced in the vicinity of the user in a three-dimensional manner. As a result, the communication can be achieved as if the partner were in front of the user of the apparatus. Moreover, according to the embodiment, only the image of the human face is transmitted, namely, the background image is not included in the transmission data. Furthermore, the quantity of codes are allocated for each portion according to the priority level or significance level thereof. Consequently, high-quality pictures can be transmitted even through a transmission path of a low transmission rate.

Figure 12:
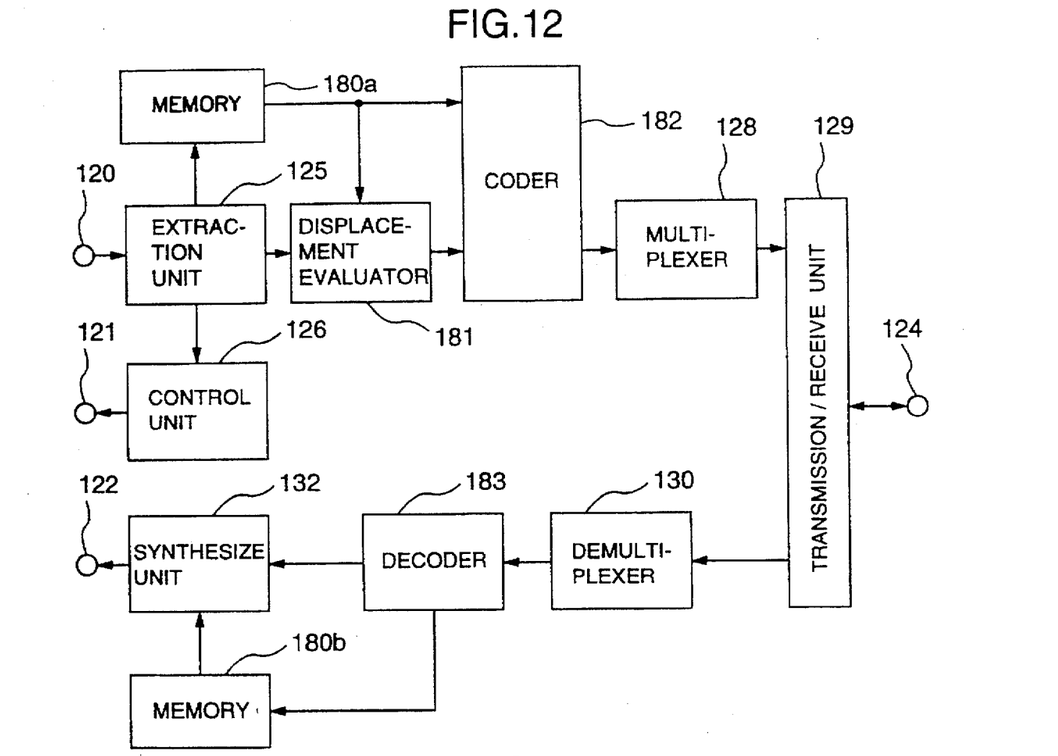
FIG. 12 is a diagram showing a third embodiment according to the present invention.

FIG. 12 shows an alternative embodiment according to the present invention. The diagram specifically shows constitution of the encoding apparatus in which the same constituent components as those of the preceding embodiments are assigned with the same reference numerals. The apparatus of FIG. 12 includes memory means 180a, 180b, a displacement evaluator 131, an encoder circuit 182, and a decoder circuit 183.

Figure 11A:
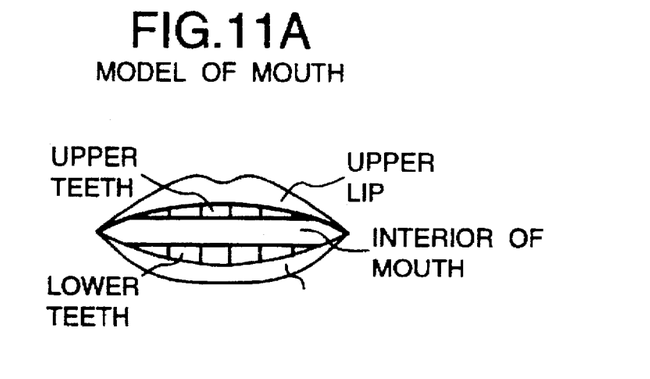
FIGS. 11A to 11C are diagrams for explaining an image model of human mouth.
Figure 11B:
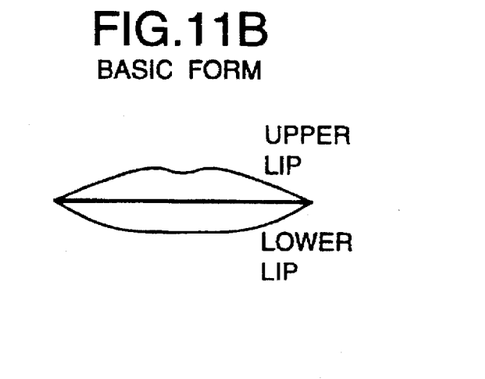
Figure 11C:
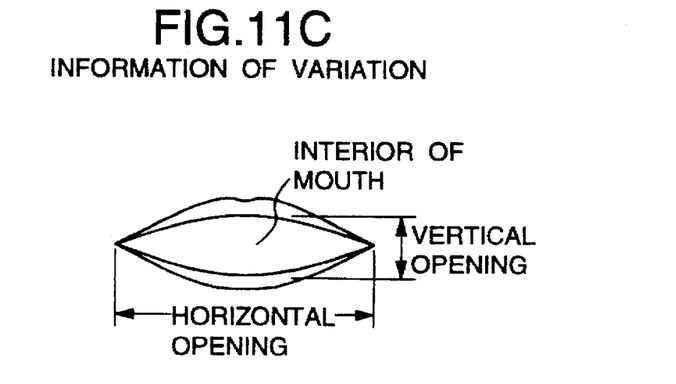

In this embodiment, in addition to extract partial images of the face, there is conducted an operation to encode information related to structure of each portion of the face. As described above, the human face includes a plurality of portions and each portion has its own structure. FIG. 11 shows an example of structure of the human face.

The image of the mouth section is considered to include the upper lip, lower lip, upper teeth, lower teeth, and interior of mouth as shown in FIG. 11A. These images do not basically vary for a person during communication thereof. Consequently, information thereof can be classified into basic image information (basic information) and information of variation or deformation thereof (variation information). For the mouth image, the basic information includes lip image data as shown in FIG. 11B and the variation information can be specified by the opening showing the interior of mouth between the upper and lower lips as shown in FIG. 11C. Video data of a variation of the mouth can be reconstructed by modifying the basic information according to the variation information. Similar processing also applies to the other extracted portions.

An image supplied via the input terminal 120 is fed to the extraction circuit 125 and undergoes an extracting operation. Basic information obtained as a result of extraction is stored in the memory means 180a and extracted images changing in a continuous manner are supplied to the displacement calculating circuit 181. The basic information for mouth portion can be decided in two methods. In a first method, a point of time to acquire basic information is specified by the user. In a second method, basic information is obtained by the apparatus. In an example of the mouth, information related to an image of the mouth in an ordinarily closed state is assumed as basic information, whereas magnitude of variation thereof is used as variation information. In the first method, a point of time when the mouth image in the closed state is obtained is determined by the user. In the second method, an image of only the mouth is attained by an extracting operation. Magnitude of opening of the mouth is monitored after the communication is started or during a fixed period of time beginning at a predetermined point of time so as to decide a point of time when the magnitude takes a minimum value. This point of time is assumed to be when the mouth is closed, thereby attaining the basic information.

The basic information for mouth portion attained by either one of these methods is compared with the extracted image at the specified point of time by the displacement calculating circuit 181 to obtain information of displacement. The encoding circuit 182 receives as inputs thereto the basic information and variation or displacement information and then encodes the information. For each extracted image, the obtained codes respectively of basic and variation information items are multiplexed by the multiplexer 128 to be transmitted via the sender and receiver section 129.

Figure 13:
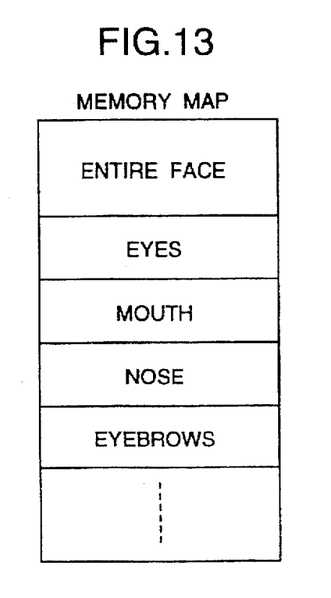
FIG. 13 is a diagram showing a memory map of video data in a memory.

FIG. 13 shows the memory format of data items in the memory means 180a. The format may be similar to that of the memory means in the extraction circuit 125.

Figure 14:
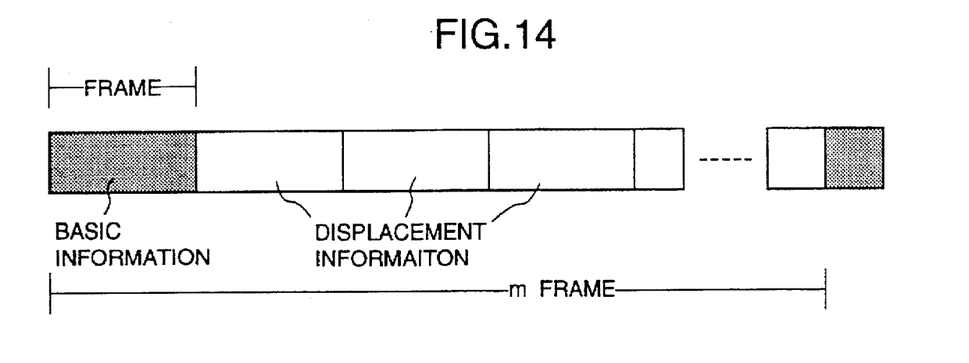
FIG. 14 is a diagram showing the encoding method of the third embodiment.

FIG. 14 shows the multiplexed data format employed by the multiplexer 128. Basic information is transmitted for each predetermined number of frames. A frame not containing the basic information is used to send variation information. Each of the basic and variation information items includes data items of the respective extraction portions.

In the data reception, received codes are disassembled by the demultiplexer circuit 130 into codes of the respective extraction blocks. Moreover, the codes are classified into those of basic information and those of displacement information. Each unit of separated information is decoded into data of basic or displacement information by the decoder 183. The basic and displacement information items are then sent to the memory means 180b and composing circuit 132, respectively. The composing circuit 132 reads the basic information from the memory means 180b to execute an operation of transforming the basic information according to the displacement information to reproduce each extraction portion and then arranges the respective extraction portions at the pertinent positions to compose an image. The composed image is delivered as an output image from the output terminal 122.

According to the embodiment described above, each extraction portion is disassembled into basic information including basic image data and displacement information including displacement data relative to the basic information so as to transmit the resultant codes. The basic information including a larger number of codes is not transmitted at each frame. Namely, the basic information is transmitted at an interval of a predetermined number of frames, whereas the displacement information including a lower number of codes is contained in each frame to be transmitted. This remarkably decreases the quantity of transmission codes.

Next, description will be given of a process in which an image attained by an imaging apparatus is transformed into knowledge description for transmission and received video data including knowledge description is converted into an original image by reference to a database containing knowledge description data.

Specifically, when an image extracted by the extracting circuit 24 is encoded by the encoder 27b, the database 40 is referenced to transform the extracted image into knowledge description.

Furthermore, when receiving image data in the form of knowledge description, the decoder 31b accesses the database according to the knowledge description to thereby decode the video data into the original image. In this operation, video data items corresponding to the respective elements constituting the image transmitted from the sender side are selectively read from the database including a multiplicity of images of models associated with objects to be imaged. The selected video data items are combined with each other to restore the original video image. Next, description will be specifically given of knowledge description. For methods of describing knowledge, reference is to be made, for example, to Chapter 8 (pages 132 to 139) of "Intelligent Image Processing" written by Agui and Nagasaki and published from Shokodo in 1994.

Figure 15A:
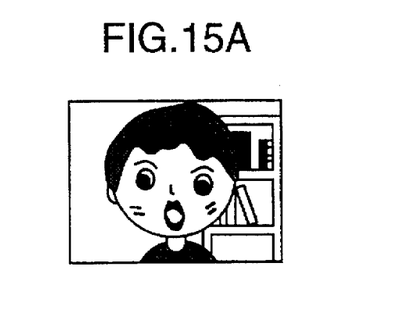
FIGS. 15A and 15B are diagrams for explaining an example of the method of converting an image into knowledge description.
Figure 15B:
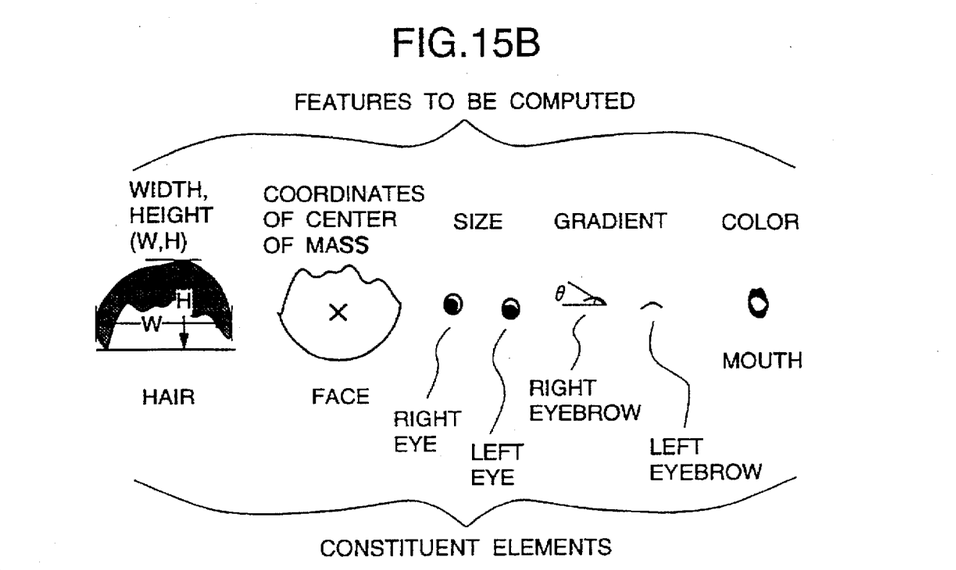
Figure 16:
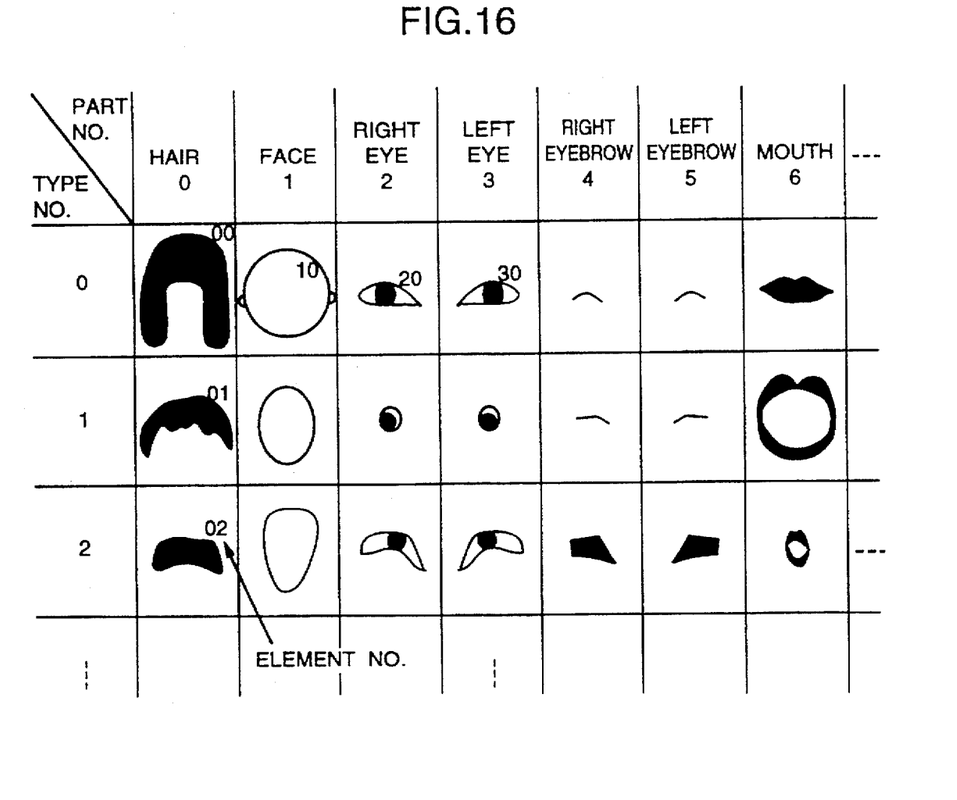
FIG. 16 is a diagram showing an example of the contents of a database.

An example of the method of transforming an image of a human into knowledge description will be described by reference to FIGS. 15A and 15B. FIG. 15A shows an image of an object obtained when shooting a person by an imaging apparatus. From this image, an image related to the person is extracted to be disassembled into constituent elements such as the hairs, face, eyes, mouth, and body so as to obtain features including the coordinates of center of mass, width, height, size, and color of each element. There are also acquired such features as the width the iris of each eye, the width and height of the interior of mouth, and gradient values of eyes and eyebrows. These features are transformed into data items respectively assigned with element numbers in association with the database as shown in FIG. 16.

Figure 17:
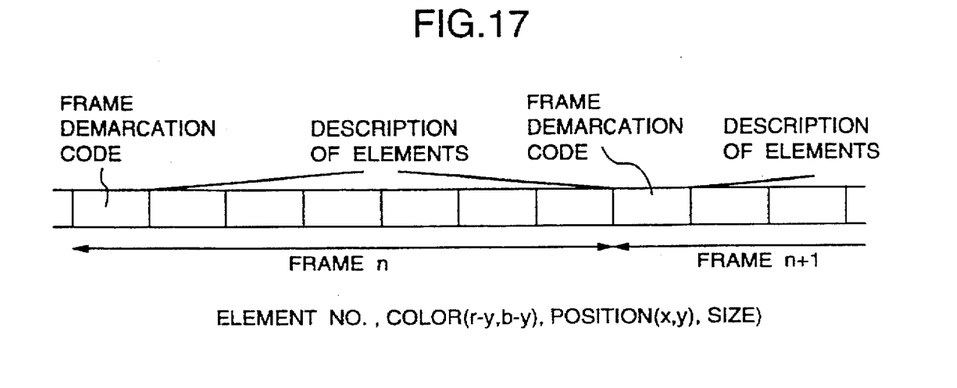
FIG. 17 is a diagram showing an example of knowledge description.

FIG. 17 shows an example of knowledge description. For each element, one set of knowledge description items is specified in the form of (element number, color(r-y,b-y), position($\Delta x, \Delta y$), size). In this expression, position($\Delta x, \Delta y$) indicates the discrepancy between the coordinates of center of mass of the pertinent object and that of each element. As can be seen from FIG. 17, data items of knowledge description of constituent elements of object are described immediately after a frame demarcation code. Assume that the object includes, for example, ten constituent elements and each element such as the element number is represented by an eight-bit data item. The amount of data required for each frame resultantly becomes 480 bits. As above, the volume of transmission data can be remarkably reduced by converting an image into knowledge description. In addition, when the system is configured to transmit only the knowledge description of a constituent element changed prior to data transmission, the amount of transmission data can be much more decreased.

To restore the original image from the knowledge description, images corresponding to element numbers of the knowledge description are read from the database to be combined with each other so as to compose the objective image. When arranging each constituent elements on the screen, the position described as (0,0) for the element in the knowledge description is aligned at the central position of the screen. As described above, since the position indicates the difference between the coordinates of center of mass of the object and that of each element, position (0,0) stands for the center of mass of the object. With this provision, there can be achieved correction of positions so that the object continuously stands at the central position of the screen in any situations.

In the direction of depth in the screen, the respective images are presented with such a positional relationship that the smaller items are arranged in the upper layers. Moreover, when colors of images of constituent elements such as the skin and iris of each eye in the database are replaced with those expressed by the knowledge description, the restored image will become more similar to the original image on the sender side.

As above, the image itself is not used as the transmission data. The image of a transmission object (such as a human face) is transformed into knowledge description representing the image so as to send data of the knowledge description to the communicating partner. On the receiver side, the original image of object is restored according to the received knowledge description. In consequence, the amount of transmission data is considerably minimized and there can be provided a videophone system capable of producing a high-quality picture in a realtime fashion even through such a communication line having a low transfer rate as an analog telephone line.

Additionally, it may also be possible in the data communication that important elements of the object are transmitted in the form of knowledge description and the other elements are transferred as video signals. In this operation, the knowledge description is transmitted in a realtime manner, whereas image information of the overall screen is transmitted at a low transfer speed in the range of the transfer rate of the communication path. When transmitting, for example, an image of a human face, images of the eyes and mouth important for communication are sent in a realtime fashion. Furthermore, when the image of the object shot by the imaging apparatus is extracted from the overall image of object by the extracting circuit and the images of the remaining portions are replaced with one color, the transmission data can be more efficiently compressed.

Figure 18:
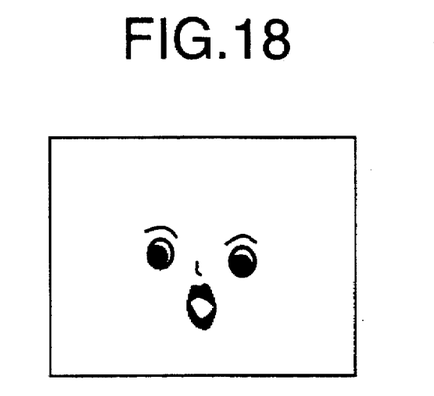
FIG. 18 is a diagram showing an image on the receiver side immediately after the communication line is established between the sender and the receiver.
Figures 19A, 19B:
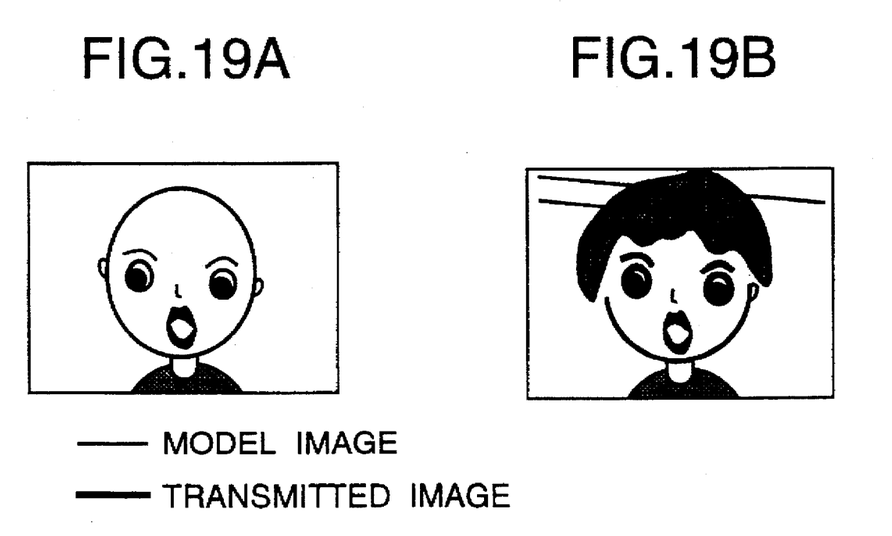
FIGS. 19A and 19B are diagrams for explaining a method of receiving an image.

However, since information of the entire screen is transmitted at a low transmission speed in the method above, only the eyes and mouth are displayed on the screen as shown in FIG. 18 immediately after the communication line is established. To overcome this difficulty, there may be prepared a model image of the human head portion in the database 1. Immediately after the communication line becomes available, the eyes and mouth are composed according to the knowledge description received in a realtime manner such that the images of eyes and mouth are combined with the model image so as to display the composed image on the screen as shown in FIG. 19A. As can be seen from FIG. 19B, when the model image is replaced thereafter with images sequentially received from the sender side, there is continuously displayed a natural image even immediately after the communication line is connected. Namely, the presented image is gradually changed from the model image into the human image of the sender without causing any undesirable artificial expression, and hence the viewer can obtain a naturally reproduced image.

As above, even when there is utilized a communication line of a low transmission rate such as an analog telephone line, the elements of expression and the like of a human face essential for communication can be transmitted in a realtime fashion while transferring video data of the overall screen image. This leads to an advantageous effect similar to that of the embodiment shown in FIG. 1.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. A picture communication apparatus, comprising:

imaging means;

voice input means;

extracting means for extracting at least one portion of an image of a subject from an image produced by said imaging means;

encoding means for respectively encoding the image portion extracted by said extracting means and a voice inputted by said voice input means;

communicating means for communicating via a communication network data obtained by encoding the image portion and the voice by said encoding means;

decoding means for decoding data received from said communicating means and thereby restoring the extracted image portion and the voice;

synthesizing means for composing an image;

a display having a surface including depressions and projections for displaying the image composed by said synthesizing means;

a memory for storing information representing three-dimensional positions and sizes of constituent elements of the image to be displayed on the depressions and projections of said display;

data input/output means for transferring said information from said memory to said synthesizing means, whereby said synthesizing means synthesizes the image according to the information received from said data input/output means and the extracted image portion decoded by the decoding means to produce data representing the synthesized image which is coordinated to the depressions and projections of said display in accordance with said three-dimensional positions and sizes; and projection means responsive to said synthesized image data for projecting a synthesized image onto said display.

2. A picture communication apparatus according to claim 1, wherein the image of the extracted portion is a part of a human face; and the depressions and the projections in the surface of the display have a general contour similar to a human face.

3. A picture communication apparatus according to claim 1, wherein the image of the extracted portion is a part of the human face of a user of a picture communication apparatus; and the information stored in said memory represents the remaining non-extracted portion of the human face of said user.

* * * * *